United States Patent

[11] 3,564,302

| [72] | Inventors | William J. Levedahl;<br>Frederick A. Schumann; Edward A. Scicchitano, Baltimore; Gareth L. Reed, Bethesda, Md. |
|---|---|---|
| [21] | Appl. No. | 409,142 |
| [22] | Filed | Nov. 5, 1964 |
| [45] | Patented | Feb. 16, 1971 |
| [73] | Assignee | By mesne assignments, to Teledyne, Inc. Los Angeles, Calif. |

[54] NUCLEAR-THERMIONIC LUNAR BASE POWER SUPPLY
19 Claims, 6 Drawing Figs.

[52] U.S. Cl. .................................................. 310/4;
176/39; 60/203; 136/202
[51] Int. Cl. .................................................. H02n 3/00
[50] Field of Search ........................................ 176/39, 60,
65, 40, 41, 87; 310/4; 60/203; 176/39 (Inquired);
310/4 (Inquired); 60/203 (Inquired); 136/202

[56] References Cited
UNITED STATES PATENTS

| 3,223,591 | 12/1965 | McLafferty | 176/39X |
| 3,285,534 | 11/1966 | Wyatt | 136/202X |
| 3,022,238 | 2/1962 | Kolflat | 176/40 |
| 3,133,091 | 12/1963 | Rasor et al. | 176/39 |
| 3,215,868 | 11/1965 | Pidd | 176/39X |
| 3,234,412 | 2/1966 | Sankovich et al. | 176/39X |
| 3,272,658 | 9/1966 | Rush | 176/39X |
| 3,089,840 | 5/1963 | Carter et al. | 176/53X |

Primary Examiner—Reuben Epstein
Attorney—Fleit, Gipple & Jacobson

ABSTRACT: A nuclear powered direct energy converter system employing a cylindrical radiator spaced from the converter and particularly well suited for lunar applications. One embodiment is adapted to be positioned in a lunar crater which constitutes radiation shielding, while another is adapted to receive radiation shielding in the form of lunar material. Reflectors positioned at an angle with respect to the cylindrical radiator reflect thermal radiation received therefrom in an axial direction.

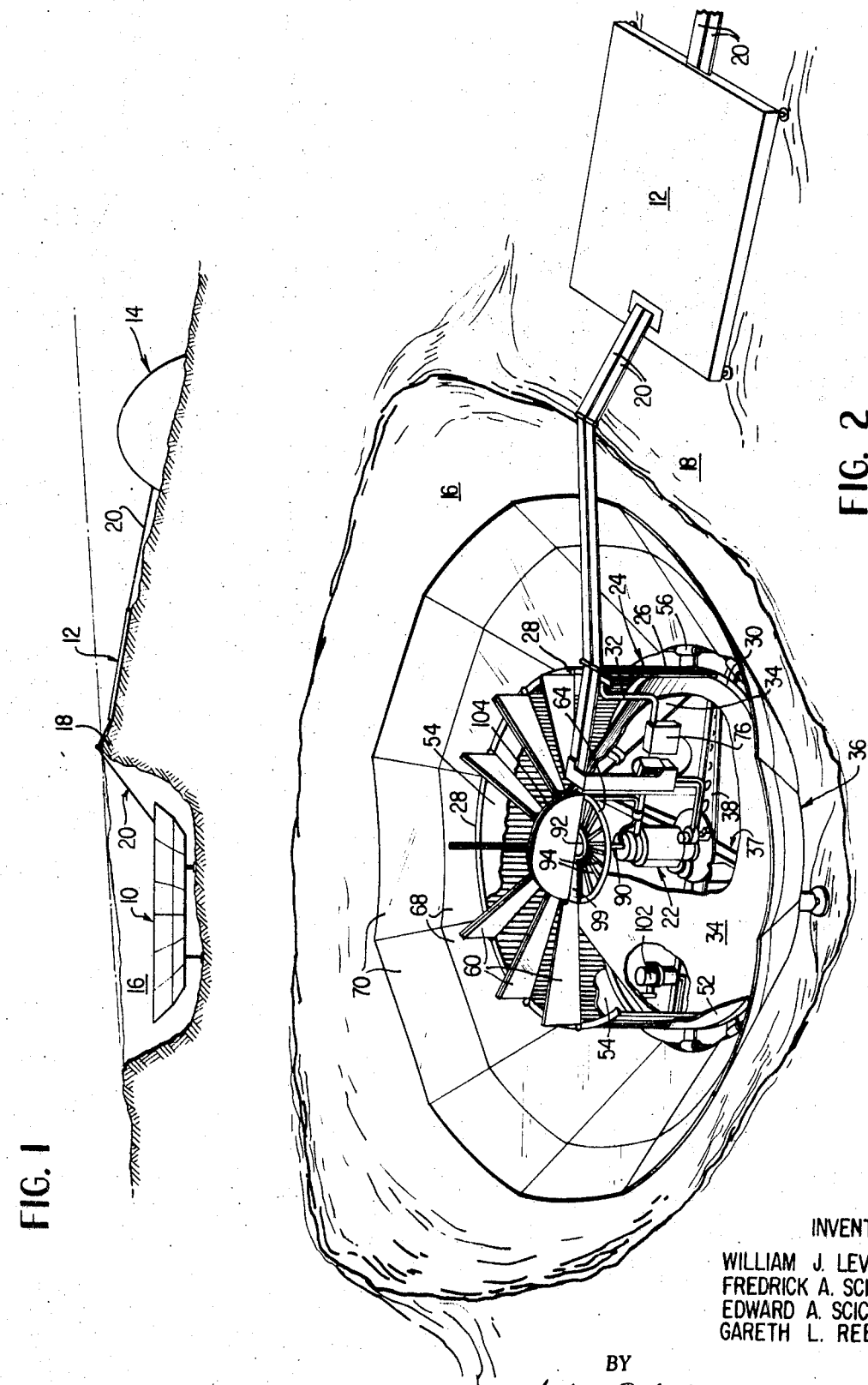

PATENTED FEB 16 1971

INVENTORS.
WILLIAM J. LEVEDAHL
FREDRICK A. SCHUMANN
EDWARD A. SCICCHITANO
GARETH L. REED

BY
Sughrue, Rothwell, Mion, Zinn & Macpeak
ATTORNEYS.

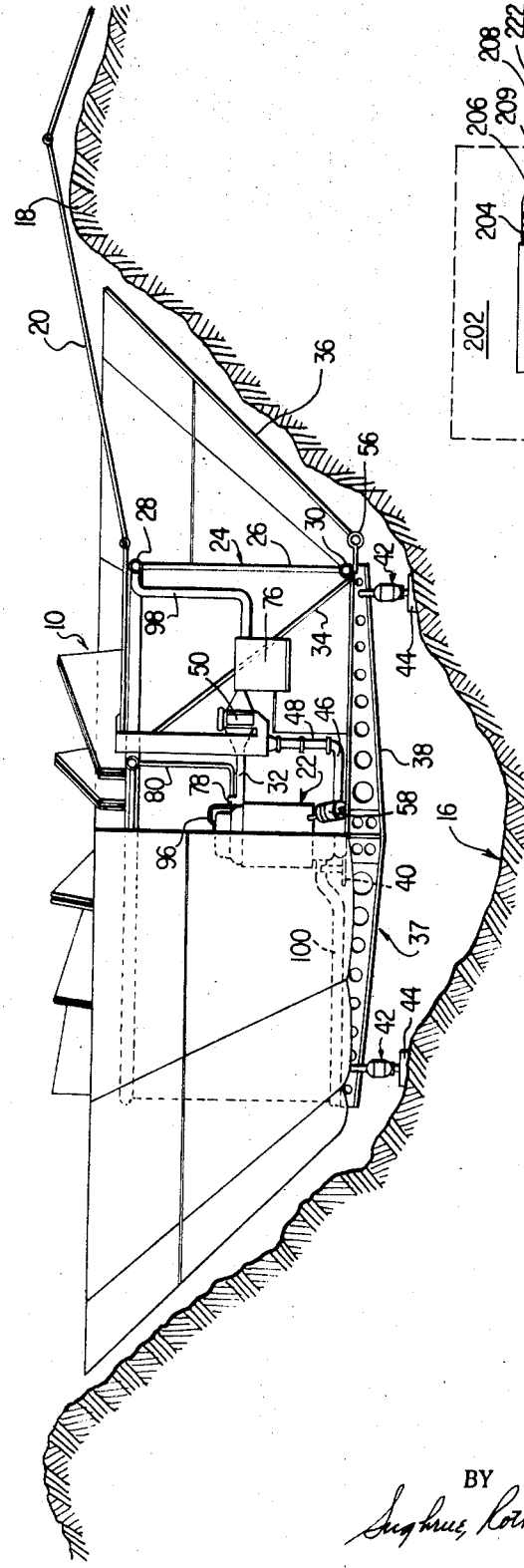

NUCLEAR-THERMIONIC LUNAR BASE POWER SUPPLY

This invention relates to a nuclear-thermionic power system, and more particularly to a simplified, compact power plant of this type for lunar application capable of providing large quantities of energy for extended periods of time with maximum reliability.

In providing the large quantities of energy necessary over extended periods of time during lunar surface exploration, the power supply system should take the form of a single unit which may be carried by a single logistic vehicle. Within the weight and size confines of such lunar logistic vehicles, only reactor systems with high heat rejection temperatures are feasible, thus eliminating the Rankine cycle systems having lower heat rejection temperatures.

Such plants must be within the weight, size and center of gravity limitations of the advanced Saturn and the lunar logistic vehicle. Of the several types of nuclear power plants under investigation, the thermionic-nuclear reactor powered systems seem to provide many advantages which uniquely qualify it for lunar power applications.

With respect to its use on the surface of the moon, the conventional type of direct conversion systems which employ an aboveground reactor and radioactive coolant system require more shielding than can be carried from the earth on the basis of economic feasibility. Assuming placement of the reactor on the flattened surface of the moon, the use of lunar material for shielding the systems requires extensive and probably impracticable earth moving. The employment of other systems in which the reactor is buried require excavation and covering of the reactor, which also may not be practical. In present aboveground radiator types, there is the inherent requirement of multiple-loop cooling systems to eliminate dangerous radiation. At the same time, such systems are open to meteoroid bombardment and the weight required to protect the system is necessarily large. In the case of multiple unit systems, or other noncompact systems, the system components are difficult to move to the installation point, which may be 1 mile from the landing site. Additionally, assembly of such units on the moon is restricted severely.

It is therefore a primary object of this invention to provide an improved nuclear-thermionic power system which is especially adaptable for lunar base application, which is highly compact, extremely simple in construction and requires no lunar assembly.

It is a further object of this invention to provide a system of this type which does not require precise positioning on the lunar surface, in one form eliminates the need for handling any lunar material, and is relatively invulnerable to meteoroid bombardment.

It is a further object of this invention to provide an improved power system of this type which may be easily transported by a lunar logistic vehicle, requires no logistic shielding, and in which the power plant comprises a single waferlike module approximating the lunar logistic vehicle transverse dimension, with the center of gravity within the module.

It is a further object of this invention to provide an improved power system of this type which employs a unique, high-temperature radiator whose temperature is readily controllable and provides maximum thermal radiation of waste heat.

It is a further object of this invention to provide an improved power system of this type which is particularly applicable for operation within a natural lunar crater with radiation shielding being provided by the walls of the crater itself.

Further objects of this invention will be pointed out in the following detailed description and claims and illustrated in the accompanying drawings, which disclose, by way of example, the principle of this invention and the best mode which has been contemplated of applying that principle.

In the drawings:

FIG. 1 is a side elevational view of the improved nuclear-thermionic lunar base power system of the present invention.

FIG. 2 is a perspective view of one embodiment of the power plant and the power-conditioning means forming a portion of the system shown in FIG. 1.

FIG. 4 is a side elevational view of the power plant shown in FIGS. 2 and 3.

FIG. 6 is a schematic view of the components forming the thermal radiation system for the apparatus of the second embodiment.

Figure 3:
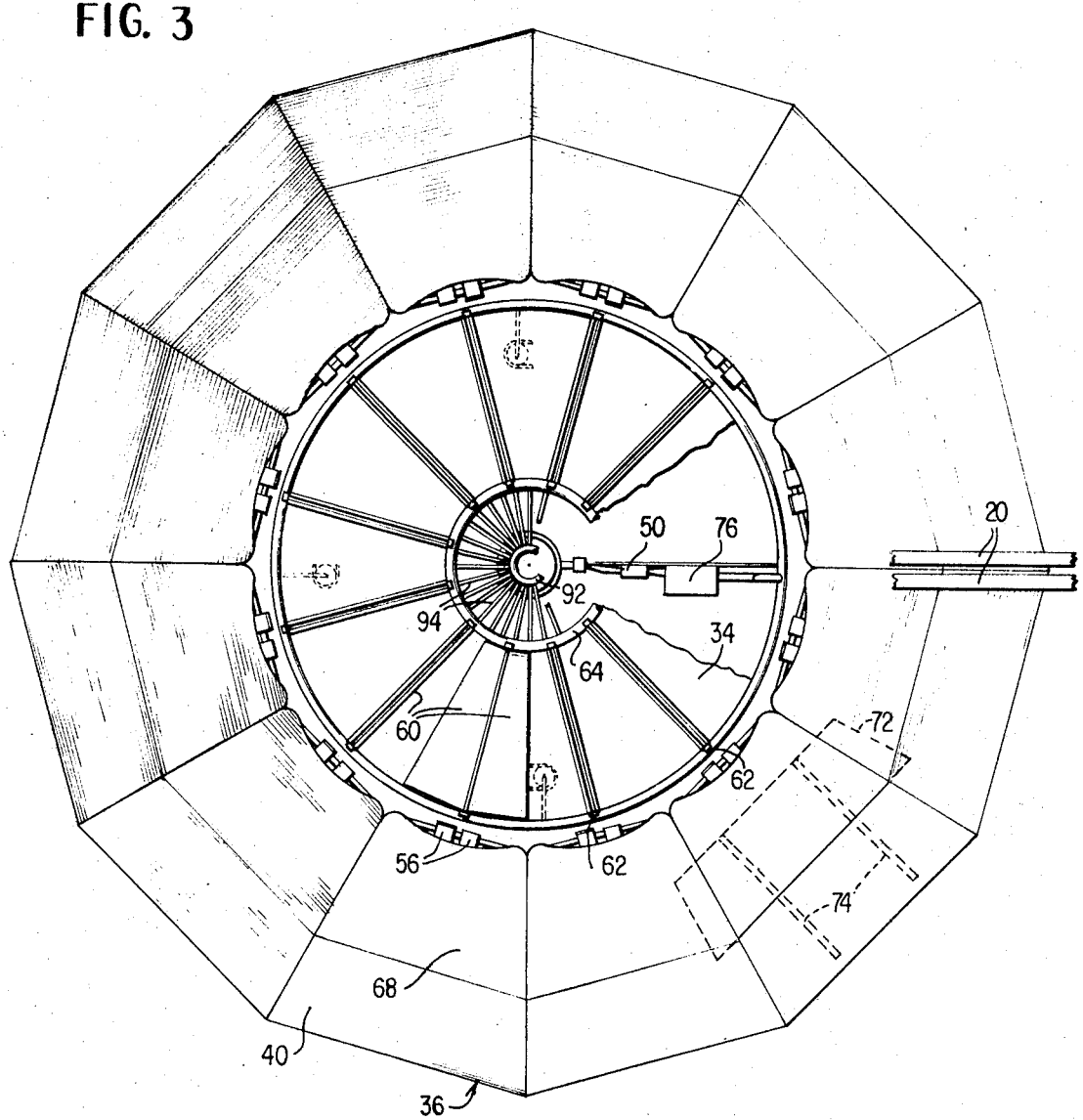
FIG. 3 is a top plan view of the power plant shown in FIGS. 1 and 2.

In general, the apparatus of the present invention includes a simplified, unitary and compact power plant in the form of a waferlike module having a diameter in the retracted position just less than that of the booster transport vehicle. The apparatus includes a nuclear-powered thermionic reactor positioned centrally on a cruciform support with individually-operable leveling pads at the cruciform extremity. A cylindrical radiator assembly is rigidly secured to the cruciform support, concentric with the reactor. An internal, frustoconical reflector is positioned within the vertically oriented cylindrical radiator. A plurality of reflector petals are in juxtaposition to the lower extremity of the cylindrical reflector and are adjustably pivoted from a vertical to an inclined position. The power plant is adapted for positioning within a lunar crater whereby the waste thermal energy is radiated upwardly by the inclined inner and outer reflectors and the crater may act as a radioactivity shield. Thermal energy radiation is controlled by angularly orienting the inner and outer reflectors and/or by the use of thermal shutters which cover the inner or outer reflectors to reduce thermal radiation therefrom. The nuclear-thermionic generator provides the power needed to circulate the coolant through primary and secondary loops during normal operation. A radioisotope powered, thermal electric generator provides power during nonoperative use to circulate coolant through the primary loop. The secondary coolant loop controls the vapor pressure of cesium associated with the reactor-converter and includes its own radiator and pivotable thermal radiation control shutters. The control circuitry and the electric power converters are contained in the power-conditioning and control means positioned remote of the crater, well protected from radioactivity. In an alternative embodiment for operation on the flattened surface of the moon rather than within a crater, radioactive shielding is provided by a cylindrical mass of natural lunar material positioned coaxially of the reactor, between the reactor and the cylindrical, vertically oriented, radiator assembly. In this embodiment primary and secondary main coolant means are provided with the secondary coolant means comprising a plurality of separate loops connected by separate pumps to separate portions of the annular vertically oriented radiator assembly. The primary coolant loop is radioactively shielded from the secondary loop with the primary coolant loop being positioned within the natural lunar material radiation shield, allowing manual maintenance of the outer radiator without harmful radiation effects.

Referring to the drawings, FIG. 1 discloses the three main sections of the improved nuclear-thermionic lunar base power system, including the simplified, unitary, and compact power plant 10, which is in the form of a "wafer" or module for positioning within the booster transport vehicle generally known as the LLV or Lunar Logistic Vehicle. The wafer form of the present power plant 10 has a diameter just less than that of the booster transport vehicle (not shown) and occupies minimum space. This configuration is ideal for packaging along with other payload "wafers." The second component of the system is the power-conditioning means 12 which is positioned between the power plant 10 and the lunar shed 14. As stated previously, the improved nuclear-thermionic power system has particular applicability to the physical environment of the moon surface. Due to the presence of a large number of nature-formed craters, the power plant 10 is adapted for positioning within the crater 16 with the power-conditioning means 12 positioned beyond the crest 18 of the crater and the lunar shed 14 positioned at some distance from the crater. Suitable electrical connections are made between the three units of the system by means of cables 20. It may be readily appreciated that the vertical extremities of the power 10 are well below the crest 18 of the crater 16 such that the power plant per se is subjected only to meteoroid bombardment which is either vertical or nearly so. At the same time, the side walls of the crater adequately protect men and other installations such as those within the lunar shed 14 from radiation exposure.

FIGS. 2, 3 and 4 show one embodiment of the power plant 10 forming the primary element of the improved power system. The power plant itself consists of two major parts. The first of these is the reactor indicated at 22. The second major part is the primary coolant radiator assembly indicated at 24. While the basic nuclear-thermionic power plant can be arranged in many different configurations, a preferred configuration is shown in detail in FIGS. 2, 3 and 4. This configuration is particularly suited for lunar missions and basically comprises a cylindrical radiator assembly 24 consisting of vertical tubes 26 which may or may not have integral fins. The vertical tubes 26 are connected at either end to annular headers 28 and 30 which in this case are approximately 20 feet in diameter with the vertical tubes 26 being approximately 8 feet in height. The upper header 28 receives coolant from reactor 22 through conduit 32 with lower header 30 returning coolant through conduit 100 to reactor 22, thus forming the primary coolant loop. A conical frustum 34 has its base connected to the lower header 30 and doubles as a structural member and forms an inner reflector for the radiator. Thin sheets of stainless steel 36 cover the outer surface of the radiator during the transportation phases and pivot outwardly prior to operation to become a petal reflector.

The power plant 10 forms a compact, low-center-of-gravity wafer module which can be located in the lower cylindrical portion of the lunar logistic vehicle (not shown). It is not only structurally self-supporting, but it is also capable of supporting additional payloads which may be mounted above it. Since the basic package weighs approximately 10,000 pounds for the size capability described herein, including the power-conditioning means, a sizable additional payload may be accommodated within the 25,000 pound capability of present LLV's. The unitized, rigid power plant structure 10 is entirely preassembled and pretested prior to mounting on the LLV. From this time until the reactor is put into operation on the lunar surface, no construction, fabrication or assembly are required.

A lightweight cruciform base 37 supports the unit including the reactor 22 and consists of four tapering beam members 38 joined at the center and fixedly secured to an annular platform 40 which acts to support the reactor 22 centrally of the power plant. At the end of each of the beams 38 there is provided independent surface supports 42 which comprise simple rigid columns deployed to the desired extension with the pad 44 resting upon the inner surface of the crater 16. Automatic means are provided within the device for leveling of the platform 40 and its supporting beams 38, this portion of the apparatus being quite conventional.

The supporting beams 38 forming the cruciform 37 provide a rigid foundation for the four leveling pads with these load paths being more optimum and reliable. The leveling pads may advantageously use the harmonic drive system where an extendable shaft is deployed to the required length. Further, the pads may be activated or adjusted by means of a small portable DC power source with the harmonic drives operating in a sealed environment making them particularly applicable to lunar use.

The specific type of reactor and indeed the direct conversion means form no part of the present invention. Nuclear powered, thermionic converters are well known and the present device utilizes current technology and currently available materials throughout. As mentioned previously, such a system is highly advantageous. A reactor of this type may contain cylindrical, NaK-cooled, thermionic fuel elements arrayed in a moderator matrix and surrounded by control reflectors. Each fuel element contains several series-connected cesium vapor diodes with molybdenum emitters and molybdenum or niobium collectors. The emitters are preferably built as pressure vessels to contain fission products produced in the annular uranium dioxide cermet fuel matrix, which is bonded to the cladding. Extreme power flattening is provided in the reactor by varying the fuel element spacing, radially, and the moderator density axially so that the low flux regions of the core have lower energy neutron spectra. The maximum design emitter temperature is about 1500° C. and in this particular design the rated output is obtainable utilizing larger emitter-collector gaps than normally employed and even should the average power density drop to less than 2 watts per square centimeter.

Several fuel elements are connected in series to provide about 100 volts DC output, and several of these chains are operated in parallel. Thus, the rated output can be obtained even with two of the chains open-circuited or with several hundred individual diodes short-circuited. The above-identified components of the reactor describe a conventional reactor and it is merely identified within the drawings by the numeral 22.

Direct current from each of the fuel element chains is led away from the reactor to the second major subsystem through electrical leads 46 which are attached to the upper surface of beam 38 extending outwardly from the bottom of the reactor 22 and pass upwardly along support 48 for connection to one of the two cables 20 which pass the electrical energy to and from the power plant 10 and the second major element of the subsystem, the separate power-conditioning control system control means 12 outside the lip 18 of the crater. The power conditioner 12 returns a portion of this power through the leads 20 to the electromagnetic pump 50 in the primary coolant system and supply the remainder of the voltage and frequency requirements of the lunar base itself. The nuclear reactivity control actuators, connected to the reflectors, are also controlled by the same electrical system emanating from the control center 12.

The third major portion of the system removes rejected heat from the fuel elements and pumps it to the primary coolant radiator assembly 24. One of the greatest advantages of a thermionic reactor system is the small radiator required at any given state of coolant technology. In the present system, NaK will be used as the coolant at an an average temperature of 1200° F. in both the reactor 22 and the radiator assembly 24. To show this advantage, Rankine cycle systems using the same maximum primary coolant temperature in the reactor reject their heat at temperatures averaging about 600° F., thereby requiring radiators many times larger in area than the 500 square foot radiator used in the configuration shown. At the coolant temperature indicated above, stainless steel may be used as the structural material for the entire coolant system. The use of niobium, requiring no additional weight, would remove any practical limitations on reactor coolant temperature. It is envisioned, however, that by using increased coolant temperatures through the use of niobium, etc., and by increasing thermionic performance as a result of improvement in the converter per se, the electrical output may be doubled, still utilizing a radiator of the dimensions disclosed.

The structure of primary rigidity is the cylindrical radiator assembly 24 formed of two face sheets 52 and 54 separated by the vertical tubing 26. The rigidity is more than adequate to combat launch and expected landing loads since the tube walls are heavily reinforced by material providing protection against meteoroid penetration. The upper and lower headers 28 and 30 at each extremity of the radiator 24 have the dual functions of distributing coolant flow and providing circumferential stiffening. The radiator assembly 24 remains fixed at all times. Preferably, the inner conical reflector 34 also remains fixed. The outer reflector formed by stainless steel elements 36 which may be of sandwich construction is movable, with the thin panels or petals of sheet metal 36 being supported at their inner end by hinges 56 for rotation between a normal, vertical position during vehicle transit to the position shown (approximately 45°) after positioning of the power plant within crater 16. Fluid or electric motors 58 are provided for moving the individual panels 36 or petals from a vertical to inclined position. The power means 58 may be tied indirectly to the control center 12 for full power operation upon manual initiation. The inner reflector 34 is a truncated, conical structure of stiffened orthotropic construction for minimum weight and in similar manner to the radiator assembly 24 preferably remains fixed during transit and operation use.

The reactor 22 is located in the center of the configuration supported by a stiffened cruciform 37 in the form of beams 38 at 90° to each other. Therefore, the inertial loads are beamed to the conical reflector and carried into the cone-cylinder interface ring (lower header). The beamed cruciform 37 also provides support for the power-conditioning equipment center 12 which is carried in this location during transit and removed for positioning as indicated in FIG. 1 prior to operation of the power conversion system.

Due to the lack of atmosphere, the meteoroid fluxes are high in the proximity of the lunar surface and provide a continual hazard to lunar installations. Since the gravity force is very low, meteoroids will impact the moon surface at random directions. However, the frequency and probability of meteoroid impacts is vastly reduced since only meteoroids and space debris traveling normal or near normal to the lunar surface may contact the radiator after positioning within the excavation. Secondly, the radiator assembly 24 is in a vertical annular plane, thus exposing very little surface other than the upper header 28 to this environment. Thus, advantageously, meteoroid armor on the tubes may be minimized.

In using nuclear power as the energy source for the plant, a major problem arises, that of shielding of personnel from nuclear radiation. Obviously, earth-manufactured shielding may be used, but this is undesirable, since it can easily double the weight of the entire system. An alternate solution involves the use of lunar material, transported to the reactor and deposited in a shielding tank surrounding it. The labor involved and the danger to the integrity of the reactor system minimizes this possible solution. The present reactor-converter, in its preferred form, is specifically designed for use in an existing or blasted crater, in this case 10 feet or more below the lunar surface so that men walking on the lunar surface some distance from the perimeter are unable to see the reactor system. A crater with a slightly raised edge would provide perfect shielding since no atmosphere is available to reflect nuclear radiation down on personnel.

Obviously, with the mere use of a vertical cylindrical radiator in a power plant positioned within a crater of this type, an immediate disadvantage is observed in that the cylindrical radiator is facing lunar material rather than open space. This apparent disadvantage is advantageously overcome, in the preferred embodiment, by utilizing reflectors 34 and 36 placed on both the inside and the outside radiator surface. The use of both the inside and outside surfaces of the radiator doubles the apparent effectiveness even if reflector efficiency is only 80 percent, and that increase in radiator heat rejection capability exceeds by 60 percent that of a single surface radiator facing outer space. This configuration therefore facilitates placement of the radiator in a subsurface location providing inherent meteoroid protection. A sizable reduction in the radiator armor weight can thus be achieved. The electronic power-conditioning and control system may be positioned advantageously outside of the crater in a sheltered control room, for instance, and connected by cable to the power plant. The electrical control equipment is then accessible for repair or modification.

By reference to FIG. 3, it is apparent that the temperature of the radiator 24 and the rate of thermal radiation may be controlled by the relative position of a plurality of radiation control shutters in the form of sectors or segments 60, the segments 60 as indicated in FIG. 2 are mounted for rotation about a horizontal axis by means of support rods 62 which extend radially outward from a tubular, annular support member 64. In FIG. 3, only the pair of shutters 60 at the bottom of the FIG. are shown in a horizontal or closed position, while the remaining shutters 60 are at vertical or open position allowing free thermal radiation of the thermal energy passing from radiator assembly 24 to reflectors 34 and reflected thereby. Automatic regulation of the temperature of the coolant within the radiator assembly 24 and the rate of thermal energy reflected away from the power plant is achieved through associated shutter control apparatus as a result of control signals from the electronic power-conditioning and control means 12. Thus, the sectors or segments 60 act as thermal control shutters for reflectivity control of the primary radiator reflecting surface 34. In the embodiment shown, the outer reflector comprises a series of petals or panels 36 which include a main section 68 and an auxiliary tip panel section 70. The main section 68 has a vertical dimension of approximately 8 feet and provides an 8 foot high module, when in the fully closed or vertical position for vehicle transport. When in the inclined position, and after having the tip panel attached thereto, the desired surface area of approximately 500 square feet is achieved, including the internal reflector surface of sheets 34. The outer reflector tip panels 70 may be rack mounted, that is, attached to the outer surface of the main section 68 when they are in vertical position during transport. The tip panels are removed or slid radially outward to the position indicated in FIGS. 2 and 3 to provide the maximum radiation surface. The dotted line position 72 of the tip panel is shown in FIG. 3 as being slid inwardly upon the racks indicated by dotted lines 74. The method of storing the tip panels and the means for moving them to their outermost radial position are mechanically commonplace and any convenient method may be employed.

One of the major stumbling blocks to lunar application of nuclear reactor systems currently under development is the requirement for start-up and restart under any operating conditions. After landing on the lunar surface, the power plant may be required to remain stagnant for a period of up to 1 year prior to transportation to the lunar base and activation. Once activated, it is subject to many shutdowns of indeterminate length and to restarts at any time of the lunar day or night.

In contrast, Rankine cycle systems currently under development are not intended to have restart capability and since they contain several loops, at least one of which is a boiling-condensing loop, even the initial start-up requires extremely complex sequency. The thermionic system utilized in the present invention is characterized by easy and rapid restart capability at any time during its life. This start-up and restart capability is predicated on the use of a small, radioisotope-powered thermal electric generator. The radioisotope generator indicated at 76 produces about 1 percent of the normal reactor thermal power produced by the main reactor 22 and is therefore capable of preventing the freezing of the NaK coolant during the lunar night. In addition, electricity produced by the generator is utilized to operate electromagnetic pumps 50 and 78 for the primary and auxiliary coolant loops. The radioisotope generator is otherwise conventional employing a long-lived radioisotope, such as plutonium–238 or strontium–90, and operates prior to lift-off of the vehicle from the earth and will continue throughout the power plant life.

Correct operation of the main reactor 22 involves proper vapor pressure of the cesium associated with each fuel element which contains several series-connected cesium vapor diodes with molybdenum emitters and niobium collectors. The proper pressure is obtained and maintained through temperature control of the cesium reservoir (not shown) which is within reactor 22. The cesium reservoir coolant which is used to maintain the proper cesium vapor pressure and temperature, is circulated through an auxiliary coolant loop, including axial conduit 90 extending upwardly from the top of the reactor housing 22 to an annular fluid coupling member 92, the fluid flow dividing and passing outwardly through a series of radial tubes 94 to the annular header 64 which also forms the inner support for the control shutter 60. Conduit 96, FIG. 4, carries the return coolant to the main reactor 22, after passage through return line 80 and the auxiliary loop pump 78. This auxiliary coolant loop is in contrast to the main coolant loop which passes from reactor 22 through conduit 32, primary coolant pump 50, isotope auxiliary power source 76, conduit 98 to the upper annular header 28 of the primary coolant of the main radiator, vertical tubes 26 to the lower annular header 30, then return line 100 to the bottom of the annular reactor 22. A number of fluid pressurizers 102 may be employed in the primary coolant system to insure proper pressure within the system.

With respect to the auxiliary radiator employing the radial coolant pipes 94, the tubes 94 may preferably be covered on either side with a thin sheet 99 of metal to form a sandwich. In addition, the loop is provided with a pair of thermal control shutters 104 in the form of semicircular discs which are shown in FIG. 2 in the vertical or open position. The shutters 104 are pivotably mounted to allow them to be adjustably moved from the vertical position shown to a horizontal position completely covering the auxiliary radiator and greatly reducing thermal radiation therefrom. Of course, simple electrical control means are provided for automatically adjusting the shutters to the proper angular position depending upon the amount of radiation desired with the electrical control signals emanating from a control center 12 automatically, or as a result of manual initiation through means positioned within the lunar shed 14. The NaK coolant is a conventional coolant in both the auxiliary and primary coolant loops and comprises a eutectic mixture of sodium and potassium in which the percentage of potassium is approximately 78 percent to provide the lowest freezing temperature for the coolant.

Figure 5:
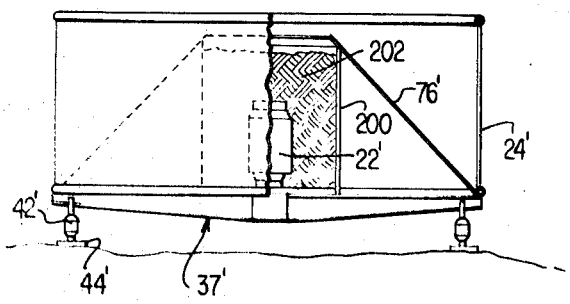
FIG. 5 is a side elevational view, partially in section, of a second embodiment of the improved power plant of the present invention in simplified schematic form.

Reference to FIGS. 5 and 6 discloses an alternative embodiment which differs primarily from the preferred embodiment shown in FIGS. 2, 3 and 4, by (1) the provision of an alternative coolant-system configuration, and (2) the provision of natural lunar material radioactivity shielding means. These changes allow the use of the power plant system on the surface of the moon rather than within a natural or artificial crater. Instead of having the reactor coolant pumped directly to the main radiator assembly, the reactor coolant is pumped to an NaK heat exchanger with the coolant loop all well armored and invulnerable. In general then, the secondary side of this heat exchanger is split into several discrete segments, each of which is connected by a separate pump to a separate portion of the annular, vertically positioned radiator assembly. Since each segment of the radiator is separated, the arrangement allows one or more radiator segments to be punctured and lose coolant completely without disturbing the operation of the other segments. With the primary coolant loop radioactively shielded, and with the annular lunar shield surrounding the reactor, the coolant in the main vertical radiator assembly, being nonradioactive, allows maintenance of this portion of the coolant loop without danger to the maintenance personnel. Likewise, since there is no radiation danger due to the annular lunar shield, the system may be positioned upon the flattened surface of the moon, rather than within a crater. While there are disadvantages to this embodiment such as greater complexity, increased costs and weight, and reduced overall efficiency of the power plant, the disadvantages may be offset by difficulty in finding or forming a crater of sufficient appropriate dimension.

Specifically, this embodiment makes use of the same cruciform base 37', the cruciform support 37' being horizontally positioned by selectively extending the extensible cylinders 42' carrying the pads 44'. The reactor-converter 22' is again positioned coaxially of the support structure with the radiator assembly 24' comprising a vertically oriented cylinder positioned concentrically of the reactor-converter 22' at the extremity of the cruciform. The outer reflector assembly of the first embodiment is eliminated, however, the frustoconical inner reflector 76' is positioned between the reactor and the radiator assembly 24' and operates in the identical manner as the first embodiment.

However, a second cylindrical member 200 surrounds the reactor-converter 22' and is concentric therewith positioned between the frustoconical reflector 76' and the reactor-converter. In fact, the upper end of the cylinder 200 acts to support the inner end of the frustoconical reflector 76'. Natural lunar material 202 is positioned within the cylinder and acts as a natural radioactivity shield, the lunar material actually covering the components including the reactor-converter 22'. FIG. 5 therefore shows a simplified, schematic teaching of the physical placement of the components forming the second embodiment of the present invention. Reference to FIG. 6 shows a block form diagram of the principle components of the power system and especially the cooling loops. The reactor 22' is shown located centrally within the dotted line 200 representing the cylindrical container holding the lunar material 202. Thus the elements exteriorly of the dotted line area 200 are subjected only to relatively low and harmless radiation. The primary coolant loop includes an armored conduit 204 through which the highly radioactive primary coolant circulates. The relatively heavy side walls 206 of the conduit 204 merely indicate the presence of radioactivity shielding means for this portion of the primary loop. The secondary coolant loop comprises for example a number of individual, completely separate coolant paths which are represented in this case as an example by three spaced conduit members 208, 210 and 212, the inner ends of which are in heat transfer relation to the shielded primary loop conduit 204. The interior sections of the secondary conduits may also be shielded as shown. Thus, heat transfer is achieved as shown schematically between the primary loop within conduit 204 and the secondary loop coolant within separated conduits 208, 210 and 212. The coolant in the separated coolant loops is carried to distinct segments of the annular radiator 24' indicated respectively by blocks 214, 216 and 218. In order to provide positive coolant flow in both the primary and secondary coolant loops, primary pump 220 is shown in the primary loop and individual secondary coolant loop pumps 222, 224 and 226 are provided in the separate secondary loops.

From viewing FIGS. 5 and 6, it is readily apparent that all areas of the power plant exterior of the cylindrical shield support 200 are relatively safe from harmful radiation and therefore both the internal reflector 76' and the radiator assembly 24' including the respective separated segments 214, 216 and 218 may be approached without danger to the maintenance personnel. Since there is no crater surface in the outward radial path of radiator assembly 24', there is no need for an external, angled reflector—a distinct advantage. In addition, the separated coolant loops allow an additional means of thermal energy radiation control in that one or more of the separate loops may be shut down without interfering with the thermal energy radiation of one of the other secondary coolant loops and its associated radiator segment.

While the second embodiment is shown only in schematic fashion, the details of its structure and operation are in a sense identical to that of the first embodiment, with the exceptions noted in this rather brief description.

It is obvious, from the above description, that the apparatus of the present invention provides several prime advantages over prior known lunar power plants. The system requires no logistic shielding and the power plant requires no lunar assembly. The system does not require positioning on the lunar surface and the power plant is itself, a single wafer module within the lunar logistic vehicle with the center of gravity within the wafer. While the apparatus has been shown and described with respect to a specific capacity generator that is in the 100 kilowatt electric power range, the size of the components may be varied to the power level and vehicle requirements and the specific locations of the components may be varied to meet the specific requirements. At the same time, radiator temperature has been shown as controlled by varying the position of controllable louvers on the top of the power plant exposing a greater or less reactor reflector surface. It is obvious that the radiator temperature may be further controlled or alternatively, completely controlled merely by the varying of the angular position of the inner and outer reflectors with respect to the vertical radiator assembly.

While there have been shown and described and pointed out the fundamental novel features of the invention as applied to preferred embodiments, it will be understood that various omissions and substitutions and changes in the form and detail of the apparatus shown and in their operation may be made by those skilled in the art without departing from the spirit of the invention. It is the intention, therefore, to be limited only as indicated by the scope of the following claims.

We claim:

1. An improved nuclear-thermionic power supply in the form of a lunar logistic vehicle module comprising:
    a rigid base member;
    a nuclear powered, thermionic converter positioned centrally thereon, a cylindrical radiator assembly positioned coaxially of said converter with its axis vertically oriented with respect to said base member;
    a frustoconical reflector, said reflector positioned adjacent said cylindrical radiator with its reflector surfaces angled with respect thereto to reflect thermal energy radiated from said radiator in line with said radiator axis; and
    means for directing coolant through a loop including said cylindrical radiator assembly and said nuclear powered thermionic converter.

2. An improved nuclear-thermionic power supply in the form of a lunar logistic vehicle module comprising:
    a rigid base member;
    a nuclear powered, thermionic converter positioned centrally thereon;
    a cylindrical radiator assembly positioned coaxially of said converter with its axis vertically oriented with respect to said base member;
    internal and external frustoconical reflectors;
    said internal reflector positioned between said converter and said cylindrical radiator assembly and having reflector surfaces tapering inwardly from said reflector base; and
    said second reflector positioned externally of said cylindrical radiator and having its reflection surfaces tapering outwardly from its base and means for directing coolant through a loop including said cylindrical radiator assembly and said nuclear powered thermionic converter.

3. The apparatus as claimed in claim 2 wherein at least one of said reflectors is formed of a series of pivotable elements and said apparatus further includes means for angularly adjusting the position of said reflector elements with respect to said radiator assembly to vary the rate of thermal radiation therefrom.

4. The apparatus as claimed in claim 2 wherein said inner reflector is fixed and said outer reflector comprises a plurality of thin sheet metal petals, means for pivoting each of said petals at their lower extremities and means for adjusting the position of said petals from a position vertically aligned with said vertical radiator assembly, to a position at some angle thereto to vary the rate of thermal radiation.

5. The apparatus as claimed in claim 1 further including a plurality of radiation shutters, said shutters being mounted for pivotable movement about a horizontal axis above one of said reflectors, said shutters being movable from a vertical or open position to a horizontal or closed position to cover said reflecting surface and reduce thermal radiation therefrom.

6. The apparatus as claimed in claim 2 wherein said inner frustoconical reflector is covered by a series of pivotable, segmental shutters, said shutters being spaced circumferentially for pivotable movement about a horizontal axis, above said internal reflector surface, whereby said segments may be individually moved from a vertical or open position to a horizontal or closed position to reduce thermal radiation from said internal reflector.

7. The apparatus as claimed in claim 1, including means forming a primary coolant loop, a thermal electric converter positioned within said coolant loop, said primary coolant loop including said nuclear-thermal thermionic power converter and said cylindrical radiator assembly, said primary coolant loop further including a pump for circulating fluid therethrough, and means for delivering a portion of electrical energy generated in said thermal electric converter to said primary pump to effect flow through said primary coolant path during the period in which the nuclear powered thermionic converter is nonoperative.

8. The apparatus as claimed in claim 2 wherein said nuclear powered, thermionic converter includes fuel elements having series-connected cesium vapor diodes, means for maintaining the proper pressure of said cesium vapor including an auxiliary coolant loop, said auxiliary coolant loop including a thermal radiator positioned at the apex of said frustoconical, inner reflector, above said nuclear powered thermionic converter, said coolant loop further including means for pumping said auxiliary coolant therethrough, and shutter means positioned above said auxiliary radiator and adapted to move from a fully open to fully closed position to vary the rate of thermal radiation from said auxiliary radiator and to thereby control the pressure of said cesium vapor within said nuclear powered thermionic converter.

9. The apparatus as claimed in claim 8 further including means for delivering electrical current from said nuclear powered, thermionic converter to said second auxiliary coolant flow pump for controlling the flow of coolant through said auxiliary coolant loop.

10. An improved nuclear-thermionic power supply for use in lunar exploration comprising:
    a power plant module including a rigid base member of cruciform construction;
    a plurality of extendable leveling pads mounted at the extremities of said cruciform support;
    means for selectively actuating said pads to effect level positioning of said cruciform support within a crater on the moon surface;
    a nuclear powered thermionic converter positioned centrally on said cruciform base;
    a cylindrical radiator assembly positioned coaxially of said converter with its axis perpendicular to said cruciform base;
    an internal frustoconical reflector fixedly positioned within said cylindrical radiator assembly with its surface tapering inwardly from the base;
    an external frustoconical reflector, having its base of a diameter slightly in excess of the diameter of said cylindrical radiator assembly and having its reflecting surface tapering outwardly from its base; and
    means for effecting coolant flow through a loop, including said radiator assembly and said nuclear powered thermionic converter.

11. The apparatus as claimed in claim 10 wherein said outer frustoconical reflector includes a plurality of metal petals, said petals being pivotably mounted at their base to said power plant module and means for moving said petals outwardly from a vertical position, parallel to the side walls of said cylindrical reflector to a position at some angle thereto to vary the rate of thermal radiation by said combined reflector members.

12. The apparatus as claimed in claim 10 further including a series of arcuate shutter members in the form of sectors, means for positioning said shutters above said inner frustoconical reflector for pivotable movement about a horizontal axis from a vertical, open position to a horizontal or closed position, said shutters forming, in said closed position, an apertured, disclike cover greatly reducing thermal radiation from said inner reflector.

13. The apparatus as claimed in claim 10 further including a power conditioning and control center in the form of a relatively thin rectangular container positioned remote from said power plant, flexible cables electrically connecting said power conditioning converter and control center to said power plant, said center positioned beyond the lip of said crater receiving said power plant, remove from any harmful radiation emanating from said thermionic converter.

14. The apparatus as claimed in claim 10 wherein said external frustoconical reflector includes a series of petals pivotably mounted at the base to said power plant for moving outwardly from a first or vertical position to a second position inclined outwardly therefrom, to increase thermal radiation rate, said petals including outer panel tips, and means to readily attach and detach said tips thereto to vary the reflectivity surface of said outer reflector.

15. An improved nuclear-thermionic power supply comprising a power plant module including a rigid base member, a nuclear powered thermionic converter positioned centrally thereon, means forming an open cylinder for reception of natural lunar material positioned coaxially of said reactor surrounding the same and spaced therefrom for absorbing nuclear radiation from said converter, a primary coolant loop including said reactor within said natural lunar material shield, a secondary coolant loop having a section in thermal heat transfer relationship to said primary loop within said radiation shield, coolant loop radiation shielding means between said primary and secondary coolant loops, said secondary loop further including a cylindrical radiator assembly positioned exteriorly of said radiation shield.

16. The apparatus as claimed in claim 15 wherein said radiator assembly includes at least two completely separate flow paths, individual coolant pumps and means for operating said pumps within said paths, whereby meteoroid damage to one of said separate loops allows said other loop to operate completely independently thereof.

17. The apparatus as claimed in claim 15 further including at least one frustoconical reflector in juxtaposition to said radiator assembly for radiating thermal energy away from said base.

18. The apparatus claimed in claim 15 further including an internal frustoconical reflector positioned within said cylindrical radiator between said cylindrical radiator assembly and said annular natural lunar material radiation shield, tapering inwardly from its base.

19. An improved electrical power generating system comprising:
 a rigid base member, a nuclear powered direct electrical energy converter positioned centrally thereon;
 a cylindrical radiator assembly positioned coaxially of said converter with its axis vertically oriented with respect to said base member;
 a frustoconical reflector, said reflector positioned adjacent said cylindrical radiator with its reflector surfaces angled with respect thereto to reflect thermal energy radiated from said radiator in line with said radiator axis; and
 means for directing coolant through a loop including said cylindrical radiator assembly and said nuclear powered converter.